Figure 1:
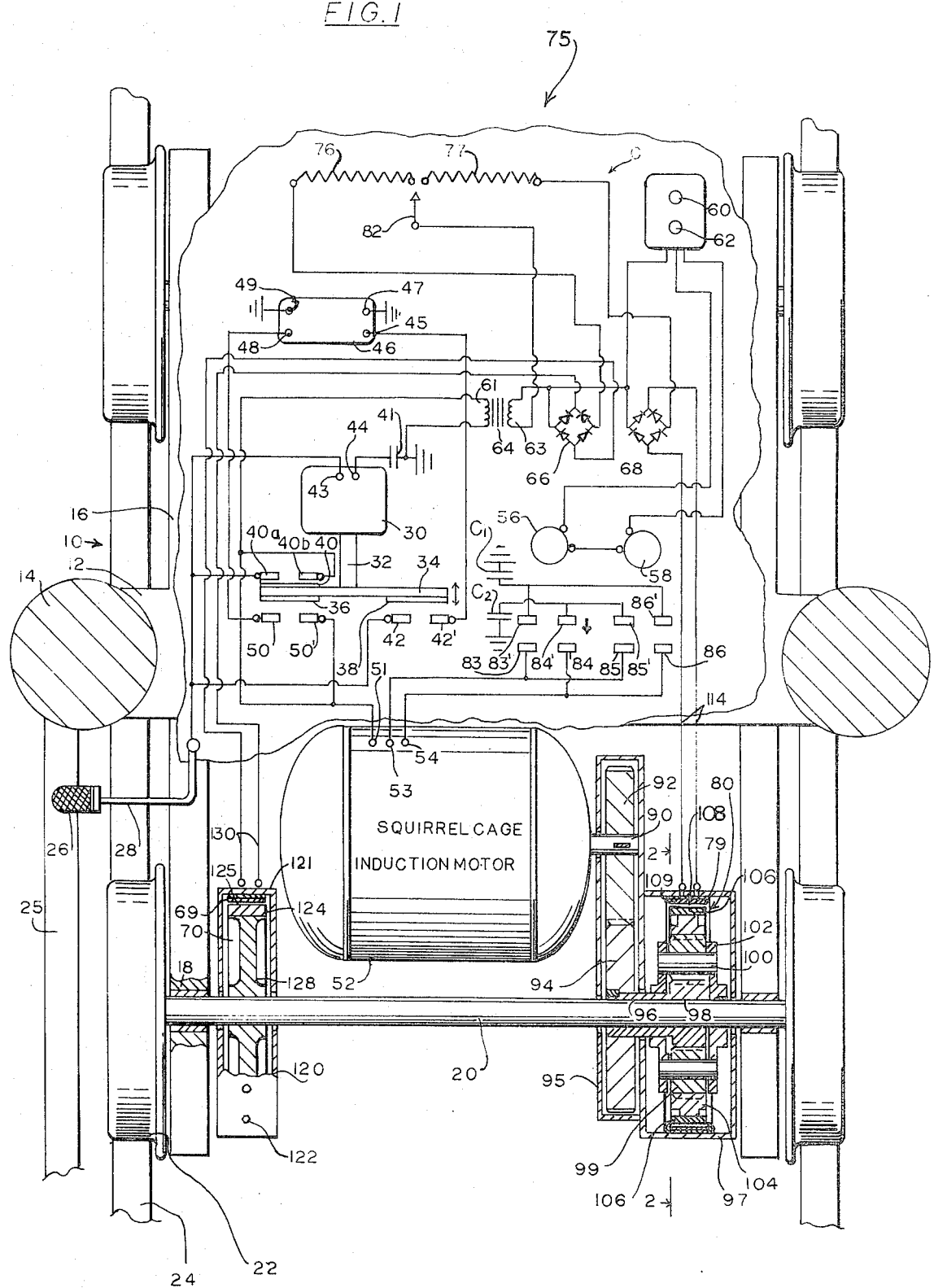

United States Patent [19]
Helmer

[11] 3,783,795
[45] Jan. 8, 1974

[54] PROPULSION SYSTEMS USING SQUIRREL CAGE INDUCTION MOTORS TO OPERATE FROM AN AC OR DC SOURCE

[76] Inventor: Robert Helmer, 19 Cornwallis Rd., Setauket, N.Y. 11733

[22] Filed: June 19, 1972

[21] Appl. No.: 264,144

[52] U.S. Cl. .................. 105/61, 74/785, 74/793, 192/9
[51] Int. Cl. ........................ B61c 9/48, B50l 9/16
[58] Field of Search ................ 105/61; 192/9, 4 R, 192/4 A; 74/785, 793

[56] References Cited
UNITED STATES PATENTS
2,603,678  7/1952  Helmer ........................ 310/103
3,527,118  9/1970  Jenson et al. .................. 74/785

FOREIGN PATENTS OR APPLICATIONS
628,051  8/1949  Great Britain ................. 105/61

Primary Examiner—Gerald M. Forlenza
Assistant Examiner—George H. Libman
Attorney—Edward H. Loveman

[57] ABSTRACT

A mechanical load is coupled to an AC drive motor via a planetary gear transmission controlled by a magnetic torque convertor such that speed of the load is variable while speed of the motor is constant. A magnetic coercive force clutch is arranged to brake the load while the motor runs continuously. The system may be energized by alternating or direct current. A DC to AC inverter provides alternating current to run the AC motor when direct current is supplied to the system. The converter and clutch are supplied with direct current via rectifiers connected to a transformer energized by alternating current. Alternatively, the transformer is energized by alternating current which may be supplied by the inverter.

15 Claims, 3 Drawing Figures

PROPULSION SYSTEMS USING SQUIRREL CAGE INDUCTION MOTORS TO OPERATE FROM AN AC OR DC SOURCE

This invention relates to torque transmission systems and more particularly concerns a motor drive system employing magnetic torque conversion devices including coercive force clutches for driving and braking a load and more specifically concerns a continuously operating AC motor for driving a subway car.

In conventional electrified rapid transit systems it is customary to employ direct current motors to drive trains on rails. This necessitates costly AC-DC motor-generator substations to generate the necessary direct current supplied to the third rails from which is drawn to drive the direct current motors. Heavy direct current transmission cables are required to carry the current to the rails. Maintenance personnel must be available at all times to operate and maintain the substations which are very costly to maintain. The direct current motors, which drive the trains in conventional fashion, are started at the beginning of a run, gradually accelerated up to running speed, decelerated at the end of a run and then stopped while train brakes are applied. The motors operate at peak efficiency only while running at a certain uniform speed, so that considerable power is lost during starting, stopping, accelerating and decelerating periods. Furthermore, in a rapid transit system such as a subway system, stops at stations are required every few minutes and are often required between stations. Thus prohibitively large amounts of power are lost during daily train operation in transit systems of the aforementioned type.

The present invention is directed at overcoming the above and other difficulties and disadvantages of conventional train propulsion systems, by providing continuously running alternating current induction motors to drive the trains. Alternating current is taken from a conventional third rail. To make the propulsion system compatible with a DC third rail, a chopper-inverter is used to convert the DC to alternating current to drive the AC motors. Each AC driving motor is started once, and kept in continuous running operation as long as the train is in use. The AC driving motor is coupled to the train wheels via a planetary gear set whose speed is controlled by an energy absorbing apparatus which permits reaction torque at low train speeds to be regenerated back into the system. While the AC motor always runs at a constant speed, starting and speed control of the wheel drive is accomplished by control of the excitation applied to the electromagnetic energy absorbing apparatus to transmit maximum driving torque to the wheels and give the train the smoothest and fastest possible rate of acceleration for a given input power.

An electromagnetic energy absorbing apparatus may be used for braking the train speed and another energy absorbing apparatus is an integral part of a magnetic torque convertor which transmits the driving torque from the AC drive motor.

The energy absorbing apparatus employed in braking the train speed is similar to the magnetic torque transmission device described in U.S. Pat. Nos. 2,603,678 and 2,779,548 where torque is transmitted through an air gap. There is no solid member to member locked position. The braking energy absorbing apparatus is comprised of two concentric members one inner member rotating within the other. The other member serves as a magnetic flux generator which produces a high intensity magnetic field with alternating North and South salient poles. The inner rotating member is a ring made of specially alloyed magnetizable steel having high hysteresis loss. This ring is mechanically coupled to the driving axle of the train wheels. When the flux generator is properly energized the high intensity magnetic field so produced will magnetize the molecules of steel in the inner ring, and thereby control the magnitude of the braking effort. When used for braking, the energy absorbing apparatus provides maximum braking effort when the train is to be stopped, from the highest rotational speed of the train wheels, and the braking effort diminishes as the train comes to a stop, thereby providing a smooth, high rate deceleration. Since the braking members are not in frictional contact there is no mechanical wear.

The invention will be explained in detail in connection with a train propulsion system. The AC motor runs at constant speed and drives the torque convertor. The convertor includes a planetary gear set either held against rotation or permitted to rotate to provide infinitely variable speeds magnetically, through the use of an energy absorbing apparatus. This is all done through an air gap with no contacting, wearing friction surfaces. The friction is entirely molecular. The output of the convertor drives the train wheels while the AC driving motor rotates at constant speed. A rheostat is used as a throttle to vary train speed by varying the magnitude of energizing current delivered to the energy absorbing apparatus.

The planetary gear set includes a sun gear driven by the AC drive motor which is meshed with planet gears carried by a carrier frame and engaged with an internal toothed ring gear. The ring gear includes a steel ring which rotates within and coacts with the magnetic field set up by an associated stationary, annular magnetic flux generator. In one embodiment, the flux generator is bolted to a housing carried by the train and provides the reaction torque for the ring gear through the rotating ring. In another embodiment the flux generator and the rotating ring function as an alternator to produce an alternating current. The output shaft or wheel axle is coupled to the carrier frame of the planetary gears.

By employing an AC induction motor and the electromagnetic energy absorbing apparatus for driving, and another energy absorbing apparatus for braking, maintenance and servicing are minimal. The squirrel cage induction motor is rugged, has no commutator slip ring or brushes, and is relatively inexpensive as compared with a DC traction motor heretofore conventionally employed. There are no mechanically wearing parts in the energy absorbing apparatus. The coils of the annular flux generators are stationary.

The system to be described is arranged so that it can be powered from an alternating or direct current source. The invention will be explained in detail in connection with a train propulsion system but it will be understood that other applications are possible.

It is therefore a principal object of the present invention to provide a mechanical drive system in which a motor is driven by alternating current continuously in one direction and is coupled to a load via magnetic torque transmission devices which control speed, acceleration, clutching and braking.

Another object of the present invention is to provide a mechanical drive system of the character described particularly applicable the propulsion of a train in a city or suburban rapid transit system.

Figure 2:
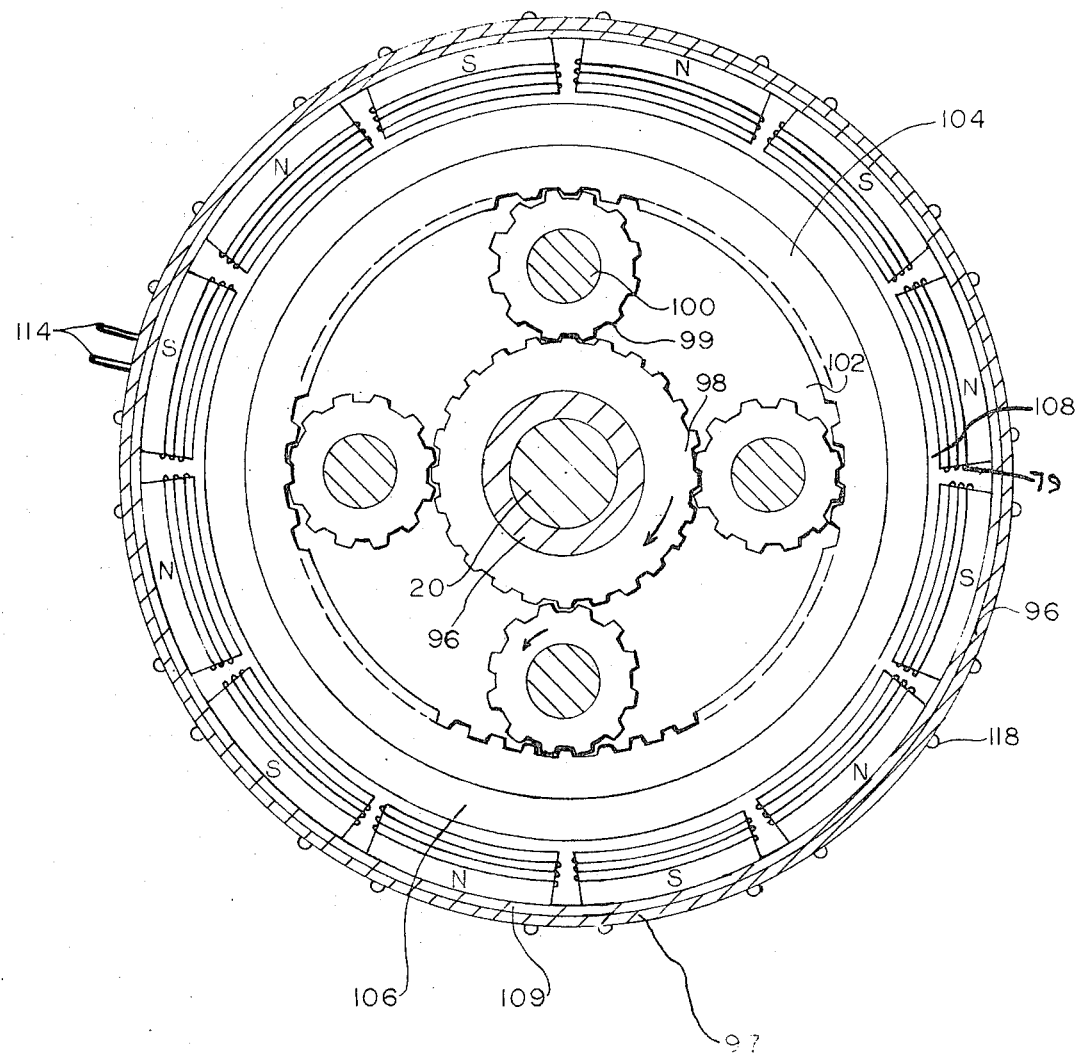
Figure 3:
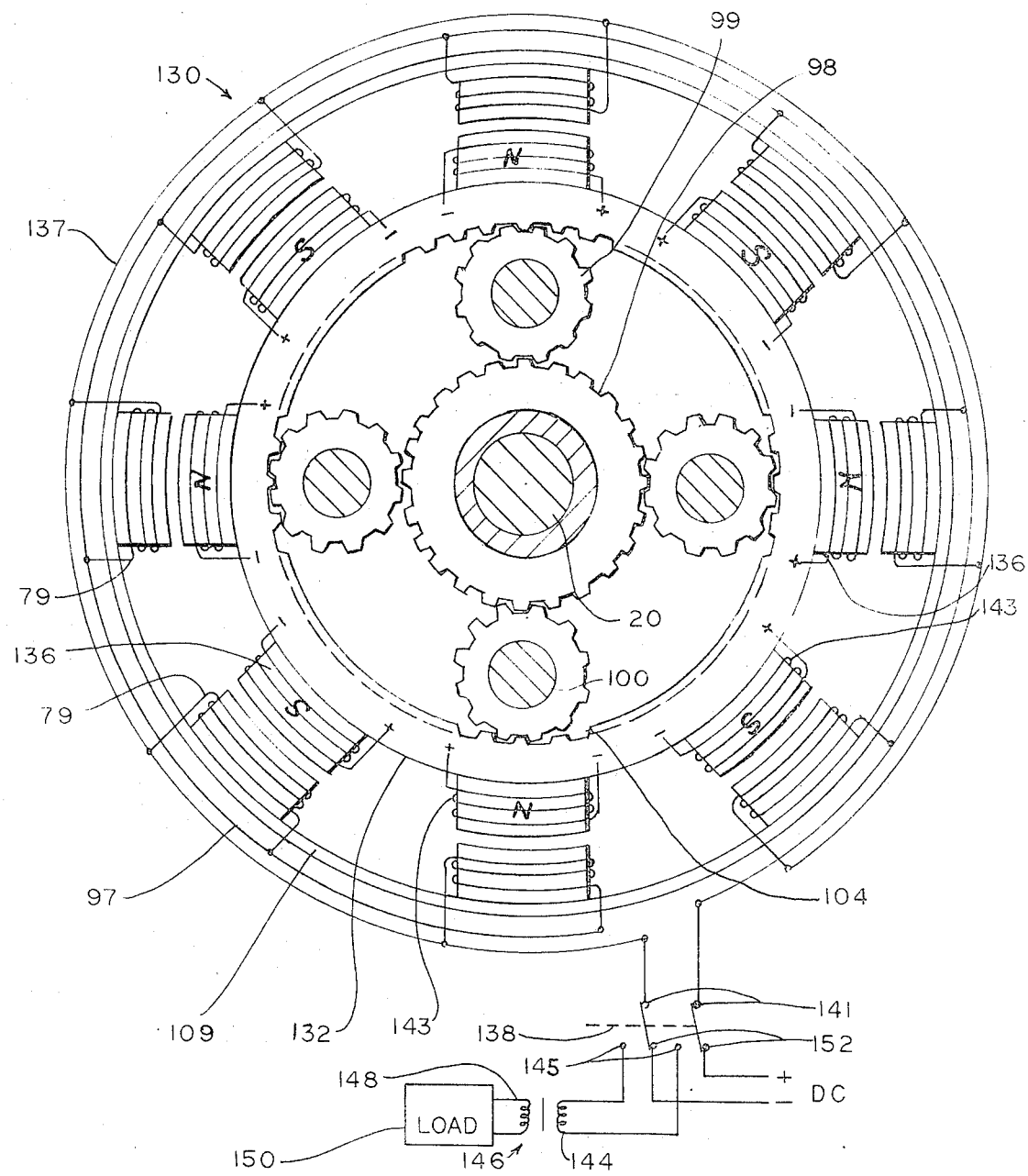

These and other objects and many of the attendant advantages of this invention will be readily appreciated as the same become better understood by reference to the following detailed description when considered in connection with the accompanying drawings in which:

FIG. 1 is a plan view partially schematic, partially in plan view, and with portions broken away, of part of a train propulsion system embodying the invention, FIG. 2 is a fragmentary vertical sectional view taken along line 2—2 of FIG. 1 showing one embodiment of an electromagnetic energy absorbing apparatus; and FIG. 3 is a fragmentary vertical sectional view similar to FIG. 2 showing another embodiment of an electromagnetic energy absorbing apparatus.

Referring now to the drawings wherein like reference characters designate like or corresponding parts throughout, there is illustrated in FIGS. 1 and 2, an undercarriage 10 of a car employed in a rapid transit system. The undercarriage includes a cross beam 12 which carries bolsters 14 on which is supported the body (not shown) of the car. A carriage frame 16 has bearings 18 through which extends a rotary axle 20 at each opposite end of which is secured a flanged wheel 22 riding on a rail 24. A third or power conducting rail 25 conducts alternating current from a power station or substation (not shown) and a contact shoe 26, which rides on the third rail 25, conveys the alternating current via a heavy bus bar 28 to an electrical circuit installed in the car.

The electrical circuit is arranged so that it is operable by either alternating current or direct current. To adapt the system for using either type of power source, there is provided an AC-DC relay 30 which has a movable armature 32 connected to an insulated arm 34 on one side of which are spaced a pair of conductive contacts 36, 38. Another contact 40 is disposed on the opposite side of the arm 34 opposite the contact 36. The contact 40 bridges a pair of contacts 40a, 40b when alternating current is supplied to the system. The relay 30 has an initial core with one terminal 43 connected to the bus bar 28 and a second terminal 44 connected to ground potential via a capacitor 41. When a train operates in an area where DC is supplied on the rail 25 the relay coil will no longer be energized since the DC will be blocked by the capacitor 41. Therefore, the arm 34 will no longer be held by the relay 30 and will drop by gravity and the contact 38 will bridge a pair of spaced contacts 42 and 42'. Thus the contact 42 is connected to the bus bar 28 and the contact 42' is connected to a DC input terminal 45 of a chopper inverter 46 which returns to ground via a terminal 47. The inverter 46 has an AC output terminal 49 which is grounded and a terminal 48 which is connected to a relay contact 50. A pair of contacts 50 and 50' are bridged by the contact 36 when the relay 30 is rendered inoperable by the application of DC current on the rail 25. The contact 50' is connected to a terminal 51 of a two phase squirrel cage induction motor 52. A pair of terminals 53 and 54 of the motor 52 are returned through respective capacitors to ground via contacts of a forward and reverse control relay 56 and 58 respectively which are operated by a respective forward and reverse control pushbutton 60 and 62. By this arrangement the induction motor 52 is driven by alternating current from the rail 25 or supplied with AC current by the inverter 46 when DC is present on the rail 25. The alternating current is also supplied to a primary winding 61 of a stepdown transformer 64. A secondary winding 63 of the transformer 64 is connected to a pair of conventional rectifier bridges 66 and 68.

The rectifier bridge 66 supplies rectified direct current to a plurality of stator coils 69 of an electromagnetic energy absorbing apparatus comprised of a coercive force clutch 70. The DC current is supplied to the coils 69 via a throttle 75 which is comprised of resistor elements 76 and 77. The resistor 76 is connected in circuit with the rectifier bridge 66 to adjust the magnitude of current applied to the coils 69 for controlling the braking of the car wheels 22. The rectifier bridge 68 is connected in series with the resistor 77 and a plurality of stator coils 79 of a magnetic torque convertor 80. Adjustment of the resistance of the resistor 77 via a throttle control 82 controls the speed of rotation of the car wheels 22 in a manner to be more specifically described.

The relay 56 operates to close and open its normally open contacts 83, 83' and 84, 84' and the relay 58 operates to close and open its normally open contacts 85, 85' and 86, 86'. The contacts 83 of the forward relay 56 is activated when the forward switch 60 is closed to close the contacts 83, 83' and the contacts 84, 84' thereby connecting the motor terminals 53 and 54 to ground via a pair of capacitors C-1, C-2 respectively, so that an induction motor drive shaft 90 rotates in a forward drive direction. When the Reverse switch 62 is closed the Reverse Relay 58 is activated to close the contacts 85, 85' and the contacts 86, 86' to connect the motor terminals 53 and 54 to ground via the capacitors C-2, C-1 respectively, so that the drive shaft 90 is driven in a reverse direction.

The motor drive shaft 90 carries a drive gear 92 meshed with a gear 94 secured on a sleeve shaft 96 journaled on bearings (not shown) to rotate on shaft 20. A sun gear 98 is secured to or integral with the shaft 96 so that the gear 98 is directly driven by the motor 52 via the gear train 92, 94. The gears 92, 94 are enclosed in a housing 95 to which is attached a housing 97 containing the magnetic torque converter 80. The housing 95 is supported by the undercarriage 10 of the car. The gear 98 is meshed with a plurality of conventional planetary gears 99 rotatably carried by a respective shaft 100 circumferentially spaced around a rotatable gear carrier frame 102. The gears 99 are meshed with an internal toothed ring gear 104 concentric with the shaft 20 and the sun gear 98. Surrounding and secured to the gear 104 is a coercive steel ring 106 which is made of a magnetizable high hysteresis loss material. The ring 106 is spaced by an annular air gap 108 from a plurality of stator poles of north and south polarity designated alternately N and S in FIG. 2 and fixed in a magnetic return ring 109. Each of the coils 79 on the stator poles are electrically connected together conventionally to form the N, S polarity illustrated in FIG. 2 and the coils 79 are connected to wires 114 which supply direct current from the rectifier 68. The N and S stator poles may be secured to the inside of the housing 97 by a plurality of bolts 118. The gear carrier frame 102 is secured to the shaft 20 which drives the wheels 22.

The coercive force clutch 70 which serves to brake the wheels 22 is enclosed in a housing 120 carried by the undercarriage 10. The stator coils 69 are spaced around a ring 121 which is secured to a housing 120 by a plurality of bolts 122. The clutch 70 includes a coercive steel ring 124 made of magnetizable high hysteresis loss material and is spaced from the stator 121 by an air gap 125. The ring 124 is secured to a disk 128 which is secured to the shaft 20. The coils 69 of the stator ring 121 are connected via a pair of wires 130 to the rectifier bridge 66 which is connected in series with the adjustable braking resistor 76. The stator ring 121 consists of alternate north and south poles as shown in FIG. 2 for the stator ring 109. By the arrangement described, both the coercive force clutch 70 and the convertor 80 are supplied with direct current adjustable in magnitude by the throttle resistor control arm 82 of the resistors 76 and 77. Only one resistor may be operatively in circuit at any one time, i.e., the wheels 22 are either being driven or braked. The variable direct current applied to the converter 80 varies the clutching effect on the ring gear 104 and thus varies the speed of rotation of the gear carrier 102 and the shaft 20, while the motor 52 continues to run at constant speed. The variable direct current applied to the clutch 70 varies the braking effect on the ring 124, the disc 128 and the shaft 20, while the motor 52 continues to run at constant speed.

The system is arranged so that it can be energized by alternating or direct current supplied to the electrical circuit. When direct current is supplied from the third rail 25, it is applied to the DC to AC chopper inverter 46 to produce the alternating current required to run the induction motor 52. When alternating current is supplied to the circuit from rail 25, its presence is noted by the AC-DC sensor relay which operates to pass the alternating current directly to the motor 52 and open circuiting the inverter 46.

Transformer 64 is supplied with alternating current from the DC to AC inverter via the contacts 50, 50' of the AC-DC sensor relay 30 when direct current is applied to the circuit from the rail 25. When alternating current is supplied from the rail 25, the transformer 64 is energized directly via contacts 40a, 40b of the relay 30. The contacts 40a, 40b are closed via contact 40 only when the relay 30 senses that alternating current is applied to the electrical circuit. When direct current is applied the relay 30 is inoperative (as previously disclosed and the contacts 36 and 38 close the contacts 50, 50' and 42, 42' respectively.)

Referring now to FIG. 3, there is disclosed an alternator 130 which is an alternate embodiment of the electromagnetic energy absorbing apparatus which may be used with the magnetic torque convertor 80. The alternator 130 has an outer stator ring 109 with poles each having a energizable coil 79' surrounding each pole. A rotor 132 of the alternator 130 is driven from the shaft 20 by the sun gear 98 and the planet gears 99 which drives the ring gear 104 as in the embodiment of FIG. 2. Surrounding an integral with the ring gear 104 is the rotor 132 which has a plurality of North and South poles 136 designated alternating North and South and with a rotor coil 143 surrounding each of the pole pieces 136. The rotor coils 143 are connected via slip rings (not shown) to receive DC current from the rectifier 68 via the wires 114 (FIG. 1). Each of the stator coils 79' is electrically connected by a pair of wires 137 which are connected to a pair of terminals 141 of a manual operable switch 138. A pair of terminals 145 of the switch 138 are connected to a primary 144 of a transformer 146 whose secondary 148 is connected to a load 150. Another pair of terminals 152 of the switch 138 are connected to the rectifier 68 (FIG. 1) to receive DC current therefrom.

In operation, with the switch 138 connecting terminals 141 to the terminal 145, an AC current is supplied to the load 150 via the transformer 146. Thus, in this embodiment the electromagnetic energy absorbing apparatus (alternator 130) utilizes the excess energy (due to slip) when the train is running at low speeds to produce an AC current and power the load 150 rather than permitting the excess energy to be dissipated into heat as in the embodiment of FIG. 2. Assuming the maximum speed of the train e.g., is 60 MPH, when the train speed reaches 50 MPH the manual switch 138 is actuated to couple together terminals 141 and 152 whereby DC current is supplied to the stator coils 179 and thereby locking or synchronizing the rotor 132 with the stator 109'.

A separate propulsion system may be provided for driving each pair of wheels 22. A suitable motor for use in a subway or rapid transit system may be a 2-phase squirrel cage induction motor operated at 3,600 RPM and energized at 600 volts AC, 60 Hertz.

The invention has been explained in detail in connection with a train propulsion system, but it will be understood that the same principles are applicable to marine propulsion. That is a vessel such as a tug boat, launch, trawler and the like may be propelled at variable speeds while the driving motors run in one direction at optimum efficient speeds. The invention is further applicable to the machine tool field to provide self-adjusting speed control drives for lathes, borers, millers, shapers, planers, etc. The invention is further applicable to the construction field for driving hoists, derricks, cranes, pile drivers, earth moving machinery and the like. The invention is also applicable for driving machinery such as winches, pumps, blowers, conveyor belts, blowers. In all these applications, the prime movers employ coercive force clutches with associated current excitation means to provide speed control and braking.

It should be understood that the foregoing relates to only a preferred embodiment of the invention, and that it is intended to cover all changes and modifications of the example of the invention herein chosen for the purposes of the disclosure, which do not constitute departures from the spirit and scope of the invention.

What is claimed is:

1. A propulsion system for driving an axle of a rail guided vehicle comprising:
   a source of electrical power;
   an AC squirrel cage induction vehicle motor;
   a mechanical transmission means coupled to said motor for transmitting torque to said axle to drive the vehicle said transmission means comprising
   a planetary gear set mechanically connected to said motor and,
   an electromagnetic energy absorbing apparatus connected to said gear and,
   transmitter and converting means for transmitting AC power to said motor and DC power to said electromagnetic energy absorbing apparatus whereby the speed of said motor is constant and the rotational speed of said axle is controlled by said DC power.

2. A propulsion system as defined in claim 1 wherein said planetary gear set comprises:
- a sun gear coupled to said motor;
- a plurality of planet gears each of which is angularly spaced around said sun gear and meshed therewith and;
- a ring gear surrounding said planet gears and meshed therewith and;
- wherein said electromagnetic energy absorbing apparatus is rigidly connected to said ring gear.

3. A propulsion system as defined in claim 2 wherein said electromagnetic energy absorbing apparatus absorbs energy from said ring gear in the form of heat.

4. A propulsion system as defined in claim 2 wherein said electromagnetic energy absorbing apparatus absorbs energy from said ring gear in the form of electrical current.

5. A propulsion system as defined in claim 2 wherein said electromagnetic energy absorbing apparatus means holds said ring gear stationary for maximum speed.

6. A propulsion system as defined in claim 1 wherein said transmitting means includes a rectifier and said source of electrical power is an AC power source.

7. A propulsion system as defined in claim 1 wherein said transmitting means includes a chopper invertor for providing alternating current to said motor and wherein said source of electrical power is a DC source.

8. A propulsion system as defined in claim 1 wherein said transmitting means comprises:
- a power conducting rail connected to said source of electrical power;
- an electromechanical sensing mechanism having an input connected to said power conducting rail and an output connected to said motor and;
- a chopper invertor connected to said mechanical sensing mechanism whereby when said source of electrical power is AC, the current therefrom is conducted through said mechanical sensing mechanism to said AC motor and when said source of electrical power is DC, the current therefrom is conducted through said mechanical sensing mechanism to said chopper to provide AC current for driving said motor.

9. A propulsion system as defined in claim 1 further including another electromagnetic energy absorbing apparatus connected to said load for controlling the braking thereof.

10. A propulsion system as defined in claim 9 wherein said motor is continuously running when said vehicle is in use and said vehicle's motion of starting and accelerating are accomplished by controlling the amount of DC power applied to said electromagnetic energy absorbing apparatus.

11. A propulsion system as defined in claim 10 further comprising a rheostat having two variable resistors connected in circuit with said transmitting means for adjusting current flow through said electromagnetic energy absorbing apparatuses and thereby control the rotational drive speed of said vehicle and the braking thereof respectively.

12. A propulsion system as defined in claim 1 wherein said induction motor is reversible to drive in either one of two directions selectively and means for selectively applying said AC power to the field windings of said induction motor for reversing its driving direction.

13. A propulsion system as defined in claim 1 wherein said electromagnetic energy absorbing apparatus is a coercive force clutch.

14. A propulsion system as defined in claim 1 wherein said electromagnetic energy absorbing apparatus comprises an alternator.

15. A propulsion system as defined in claim 2 wherein said electromagnetic energy absorbing apparatus permits said ring gear to rotate and provide an infinitely variable output speed of said load.

* * * * *